US011262935B2

(12) United States Patent
Liu et al.

(10) Patent No.: US 11,262,935 B2
(45) Date of Patent: Mar. 1, 2022

(54) OPTIMIZED DISTRIBUTED DEDUPLICATION FOR DISTRIBUTED CLUSTER

(71) Applicant: EMC IP Holding Company LLC, Hopkinton, MA (US)

(72) Inventors: Bing Liu, Tianjin (CN); George Mathew, Belmont, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 84 days.

(21) Appl. No.: 16/669,240

(22) Filed: Oct. 30, 2019

(65) Prior Publication Data

US 2021/0132852 A1 May 6, 2021

(51) Int. Cl.
*G06F 3/06* (2006.01)
*G06F 12/02* (2006.01)

(52) U.S. Cl.
CPC ............ *G06F 3/0653* (2013.01); *G06F 3/061* (2013.01); *G06F 3/067* (2013.01); *G06F 3/0631* (2013.01); *G06F 3/0641* (2013.01); *G06F 12/0253* (2013.01)

(58) Field of Classification Search
CPC ...... G06F 3/0653; G06F 3/061; G06F 3/0631; G06F 3/0641; G06F 3/067; G06F 3/0629; G06F 12/0253; G06F 9/50; G06F 9/5005; G06F 9/5016; G06F 9/5027; G06F 9/5044; G06F 9/505; G06F 9/5055; G06F 9/5066

See application file for complete search history.

(56) References Cited

U.S. PATENT DOCUMENTS

| 7,305,532 | B2 | 12/2007 | Zhu et al. | |
|---|---|---|---|---|
| 9,134,914 | B1 | 9/2015 | Derbeko et al. | |
| 9,449,011 | B1 | 9/2016 | Chen et al. | |
| 10,229,133 | B2 | 3/2019 | Vijayan et al. | |
| 10,346,076 | B1* | 7/2019 | Jonnala | G06F 3/0634 |
| 2007/0091089 | A1* | 4/2007 | Jiao | G06T 15/80 |
| | | | | 345/426 |
| 2011/0125813 | A1* | 5/2011 | Pradhan | G06F 12/0269 |
| | | | | 707/814 |
| 2015/0074677 | A1* | 3/2015 | Pream | G06F 9/5016 |
| | | | | 718/104 |

(Continued)

OTHER PUBLICATIONS

Douglis, F., et al., "Experiences with a Distributed Deduplication API," Proc 33rd International Conference on Massive Storage Systems and Technology (MSST2017), May 15-19, 2017, 11 pages.

(Continued)

*Primary Examiner* — Michael Krofcheck
(74) *Attorney, Agent, or Firm* — Womble Bond Dickinson (US) LLP

(57) ABSTRACT

Distributed deduplication wherein runtime performance of dedup pipelines in all nodes is monitored. The bottleneck for each pipeline is identified and machine resources from different nodes are reallocated to seek to balance the costs of each stage of each task in each of the pipelines. While the overall cost for each task may remain the same, stalls may be eliminated such that the total cost to complete all the tasks is reduced. The global dedup ratio and the local compression ratio may be used to weight certain stage costs.

21 Claims, 4 Drawing Sheets

(56) References Cited

U.S. PATENT DOCUMENTS

| | | | |
|---|---|---|---|
| 2016/0041887 A1* | 2/2016 | Davis | G06F 11/1076 |
| | | | 714/6.2 |
| 2016/0266816 A1* | 9/2016 | Alapati | G06F 3/067 |
| 2017/0262468 A1* | 9/2017 | Harnik | G06F 9/452 |
| 2018/0097713 A1* | 4/2018 | Larson | H04L 41/20 |

OTHER PUBLICATIONS

Dutch, M., "Understanding data deduplication ratios," SNIA Data Management Forum, 2008 Storage Networking Industry Association, Jun. 2008, 13 pages.

Guo, F., et al., "Building a High-performance Deduplication System," USENIXATC'11 Proceedings of the 2011 USENIX conference on USENIX Annual Technical Conference, Jun. 15-17, 2011, 14 pages.

Zhang, Y., et al., "Droplet: a Distributed Solution of Data Deduplication," 2012 ACM/IEEE 13th International Conference on Grid Computing, Sep. 20-23, 2012, pp. 114-121.

Zhu, B., et al., "Avoiding the Disk Bottleneck in the Data Domain Deduplication File System," FAST '08: 6th USENIX Conference on File and Storage Technologies, Feb. 26-29, 2008, pp. 269-282.

* cited by examiner

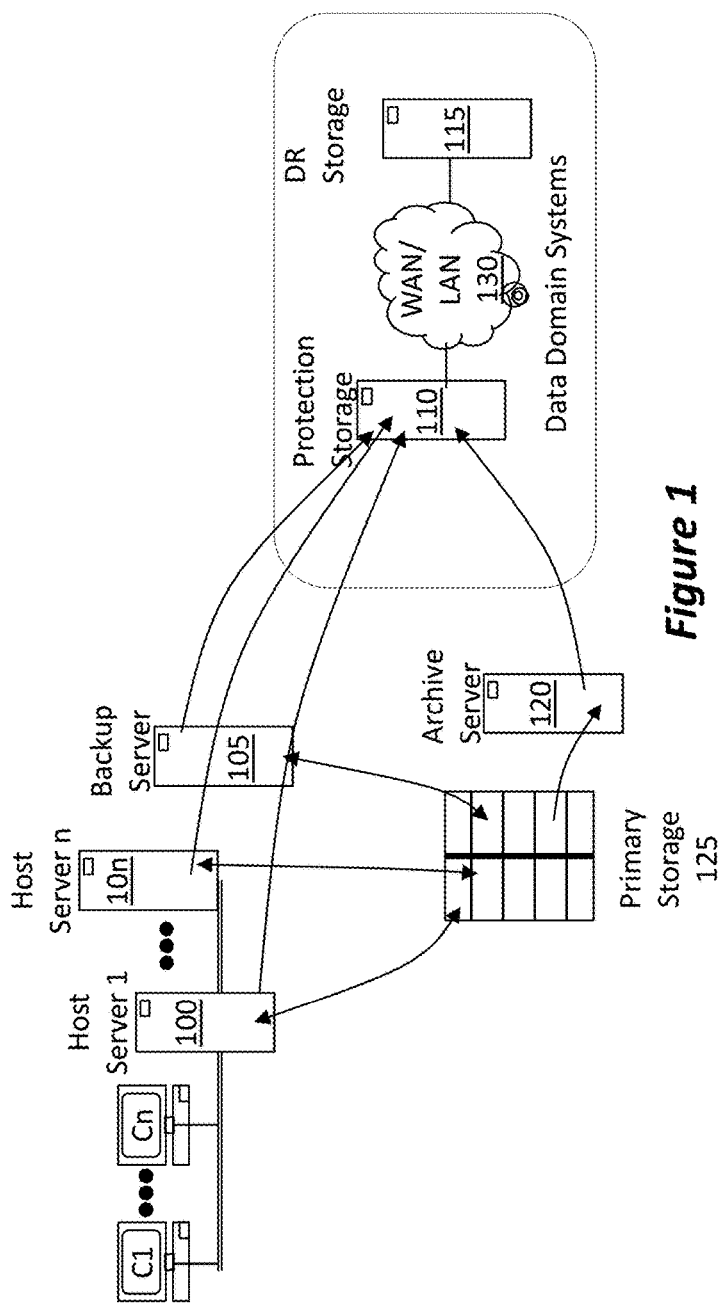
*Figure 1*
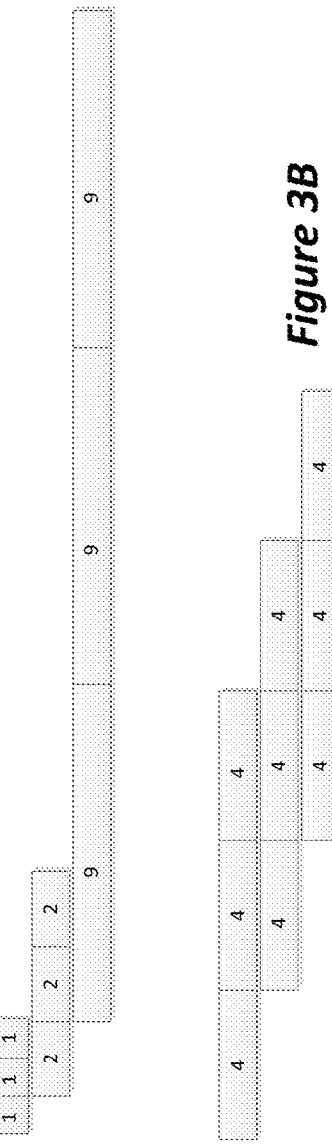
*Figure 3A*
*Figure 3B*

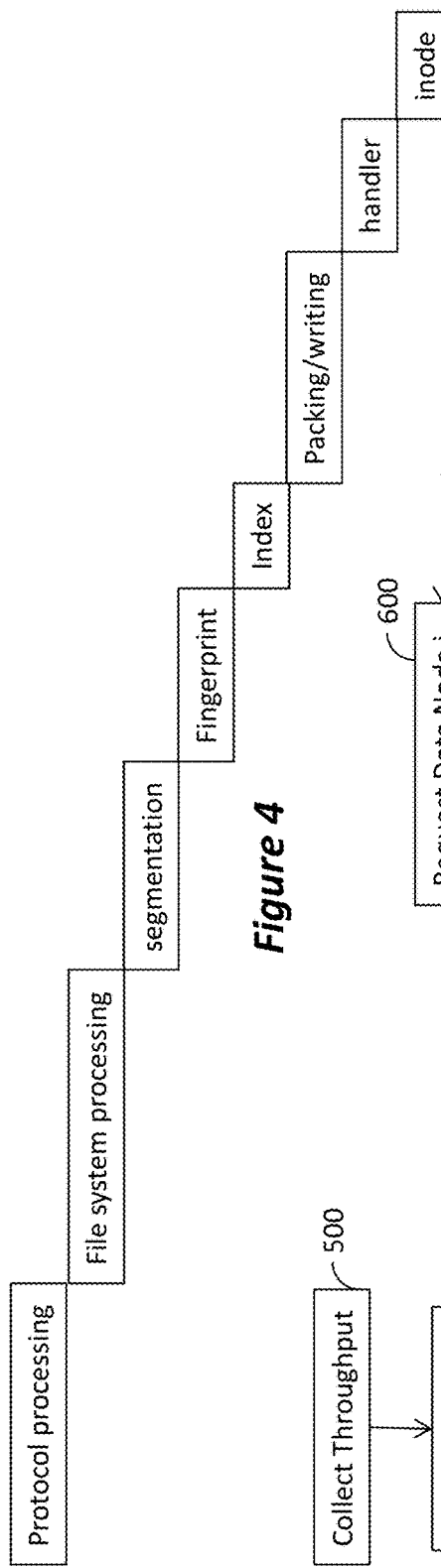
*Figure 4*
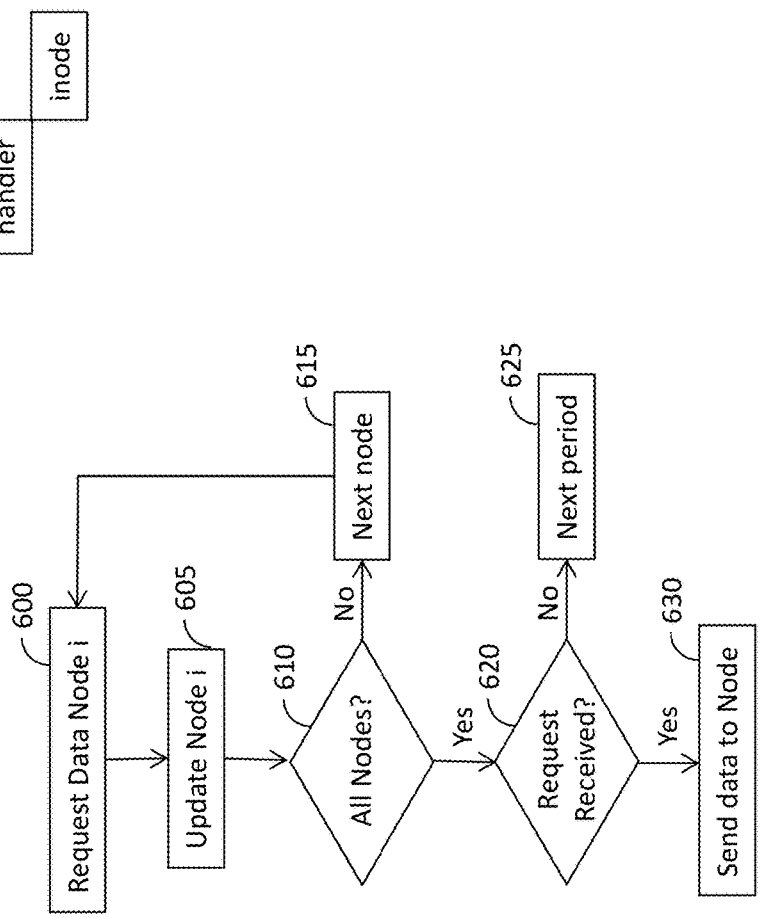
*Figure 6*
*Figure 5*

OPTIMIZED DISTRIBUTED DEDUPLICATION FOR DISTRIBUTED CLUSTER

BACKGROUND

A distributed cluster refers to a group of geographically or virtually separated, but networked, machines, which provide seamless access to services for clients. Distributed cluster architecture is beneficial to backup storage as it provides reliability, the stored data is available to all of the machines, and it is scalable by simply adding more machines to the cluster as the need increases. However, adding machines, including adding disk storage space, adds to the cost and maintenance of the cluster. Deduplication (dedup) is used to reduce the system size by eliminating duplication during storage and backup. Dedup, however, requires processing and cache capacity, and may load the transmission bandwidth. Moreover, it requires unique solutions when attempting to scale the dedup performance with the scaling of the cluster.

SUMMARY

A method, system, and computer program product providing optimized dedup for a distributed cluster by monitoring runtime performance of dedup pipelines in all nodes, identifying the bottleneck on each node, and reallocating machine resources based on the bottleneck results.

Disclosed aspects demonstrate distributed dedup wherein runtime performance of dedup pipelines in all nodes is monitored. The bottleneck for each pipeline is identified and machine resources from different nodes are reallocated to seek to balance the costs of each stage of each task in each of the pipelines. While the overall cost for each task may remain the same, stalls may be eliminated such that the total cost to complete all the tasks is reduced. The global dedup ratio may be monitored so as to ensure the overall cost is not increased and/or to determine whether the savings are sufficiently high to justify the balancing. Also, the local compression ratio may be monitored to check the effect of the balancing on the overall performance. The global dedup ratio and local compression ratio may be used to weigh the costs of certain stages in the pipelines.

BRIEF DESCRIPTION OF THE DRAWINGS

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

FIG. 1 is a general schematic of a distributed cluster for an embodiment implementing features of the invention.

FIG. 3A illustrates a traditional pipeline process to complete three tasks, while FIG. 3B illustrates an example of a cooperative pipeline process to complete the same three tasks.

FIG. 4 is a block diagram illustrating one example of segmenting the dedup task into a plurality of stages.

FIG. 5 is a block diagram illustrating an example for balancing stages in tasks.

FIG. 6 illustrates an example of a process that may be executed at each node in the cluster.

DETAILED DESCRIPTION

Figure 2:
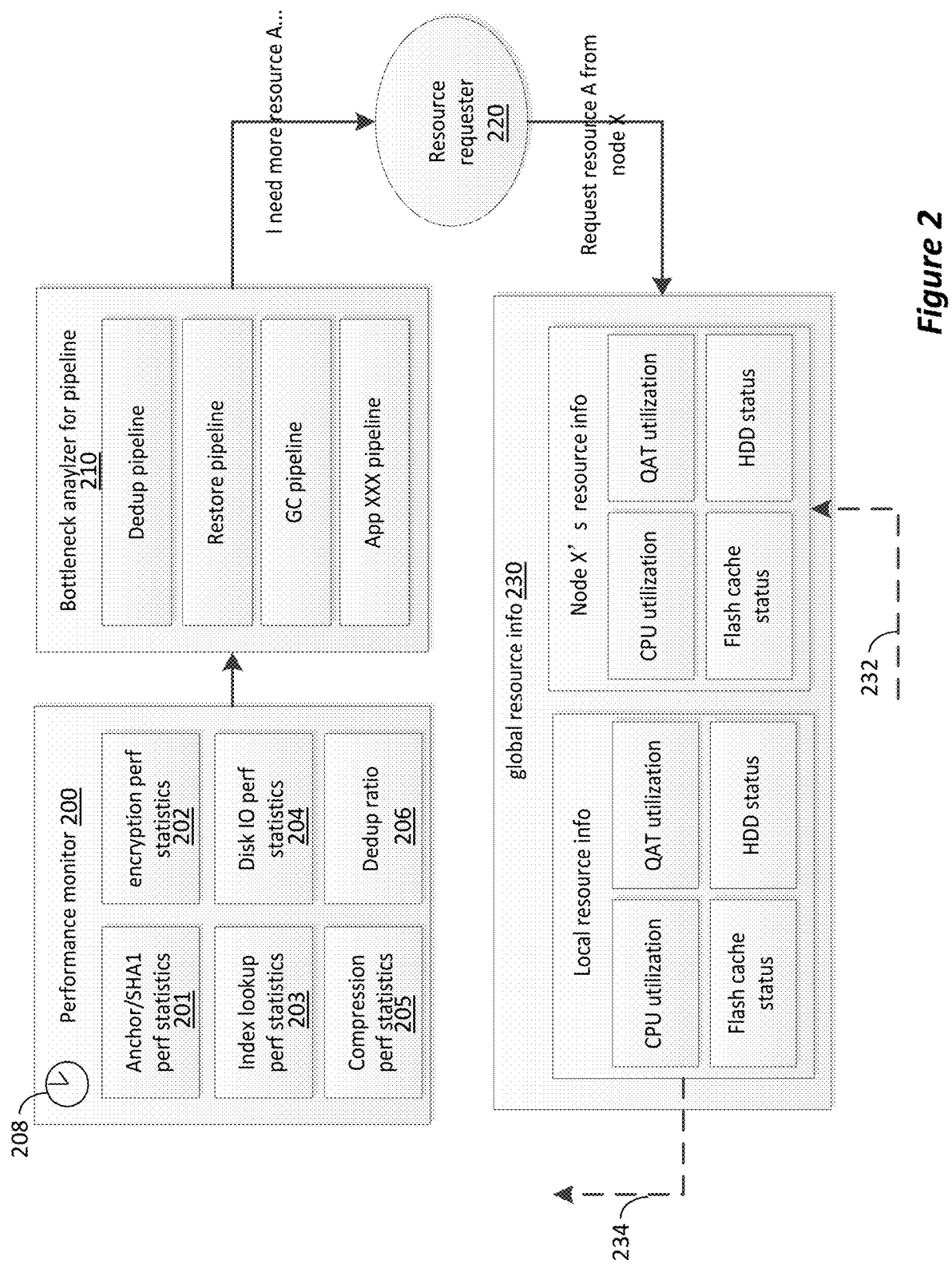
FIG. 2 is a general block schematic illustrating an embodiment of distributed deduplication with balancing stages of pipelines.

In the context of backup and archiving, writing a file more than once causes two separate issues: it increases the storage needs and it loads the network as the entire file needs to be sent to the target storage machine. Performing dedup at the target can reduce the storage needs, but does not affect the network load. Performing dedup on the source can reduce network load, but may degrade the performance of the source machine. A distributed dedup can be used to balance the computational and transmission loading with the benefits of dedup.

In general, dedup starts with protocol level processing and identifying the files for storage. NFS (Network File System) and CIFS (Common Internet File System) are protocols designed to allow a client system to view and access files stored on a remote computing device, such as a server or a PC. EMC's Data Domain Boost is a protocol designed to offload part of the dedup process to a backup server or a client. Then, file system level processing is performed, identifying the file inode, which stores the attributes (e.g., metadata, owner and permissions data) and disk block location(s) of the object's data. The data stream is then divided into blocks or segments by the process generally referred to as chunking. Loosely, blocks may refer to fixed length chunks, while segments may refer to variable length chunks; however, any mention of one in this disclosure is meant to be interchangeable with the other. For each segment, a fingerprint is generated, e.g., SHA1 (Secure Hash Algorithm 1). The process steps described thus far mainly load processing capacity. The next step, generating and storing the fingerprints index, and determining uniqueness of each fingerprint, also loads the cache. Unique segments are packed as containers and written to disks, thereby loading IO and disk resources. A new content handle is then constructed for the file, and includes pointers to packed and deduplicated segments. The inode is then updated with the dedup process results. These various steps may be allocated to be performed by the client, the backup server, the source storage or the target storage.

FIG. 1 is a general schematic of a distributed cluster for an embodiment implementing features of the invention. Client machines C1 to Cn are networked to application (or host) servers 100-10$n$, which run the applications required by the clients. The client machines C1 to Cn and application servers 100-10$n$ may be networked with any suitable network, such as, e.g., a local area network (LAN), a wide area network (WAN) such as the Internet, a corporate intranet, a metropolitan area network (MAN), a storage area network (SAN), a bus, or a combination thereof, wired and/or wireless. Application servers 100-10$n$ may be physical machines, each running one or more virtual machines, and may include physical hardware, a virtual machine manager (VMM), virtual hardware, one or more guest operating systems, one or more virtual machines (VM), and one or more virtual proxy nodes. Each of application servers 100-10n can include a backup application programming interface (API) that can access information within VMs, within operating system, and within the host, that may be needed to perform a backup or restore of a virtual machine, of data generated by a virtual machine, or of one or more virtual disks.

Primary storage 125 stores data received from application server 100. Primary storage 125 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Primary storage 125 may have a distributed architecture, or all of its components may be integrated into a single unit and may comprise a large number of disks, such as EMC® VMAX 400K with up to 5,760 hard drives.

Backup server 105 can initiate and control backing up the data from primary storage 125 in protection storage 110 and data recovery storage 115. Backup server 105 can comprise one or more computing systems and can include, but is not limited to, a polling agent, a backup application, and a configurator. The backup application can contain a backup catalog, a proxy map, and a performance monitor. The backup catalog can contain information about the files that are backed up, such as file attributes, file name, access control information, and information about layout of the files or blocks within a disk snapshot. Metadata files also backed up can include a raw disk mapping file that maps a virtual disk to one or more portions of storage, e.g. LUNs of a source storage. The proxy map can describe the mapping of VMs to virtual proxy nodes, and the location (host or proxy server) of the proxy nodes. The performance monitor can monitor performance characteristics of a backup in progress such as a data transfer rate for a particular backup, e.g. between a source storage and target storage, or a proxy storage and a target storage.

Protection storage 110 and data recovery storage 115 may be networked with any suitable network, such as, e.g., a local area network (LAN), a wide area network (WAN) such as Internet, a corporate intranet, a metropolitan area network (MAN), a storage area network (SAN), a bus, or a combination thereof, wired and/or wireless, here indicated as WAN/LAN 130. Archive server 120 supports archiving for information retention requirements of the organization.

A distributed dedup process may be implemented in the architecture illustrated in FIG. 1. In a distributed dedup, the above-described dedup process steps may be performed by different machines in the cluster, so as to minimize the processing and transmission loads. For example, DD Boost® available from Dell EMC of Hopkinton, Mass., supports distributed dedup, with clients, e.g., C1-Cn, performing chunking and fingerprinting and a deduplicating storage server determining the uniqueness of each chunk. The client then compresses and transfers only the new content, thus network load is reduced by avoiding transmission of duplicate chunks from the source to the target. Incidentally, since the chunking and fingerprinting computations were moved to the client, the target server is freed to serve more clients.

As each node may serve multiple clients, each node may experience different computational loads. For example, one node may experience more low gen backup operations while a different node may experience more high gen backups, random IO apps or restore. Consequently, some nodes may experience busy flash cache but idle QAT (Quick Assist Technology providing hardware based acceleration), while others may experience busy CPU, disk IO, etc. Of course, the loading at each node changes over time as different tasks are executed. Embodiments disclosed herein detect the loading on the nodes to balance computing and storage resources among the nodes.

FIG. 2 is a general block schematic illustrating an embodiment of distributed dedup implementing balancing the stages of tasks in the pipelines. This embodiment includes a performance monitor 200, a bottleneck analyzer 210, a resource requestor 220 and a global resource info 230. Performance monitor 200 collects performance data of each stage of all pipelines in the distributed dedup system. Bottleneck analyzer 210 uses the performance data to determine the bottlenecks for tasks in each pipeline for each node. A cooperative pipeline strategy is used for determining how to shift resources to alleviate bottlenecks. The resource requestor 220 then issues requests for specific computing or storage resources available within the cluster. The global resource bank 230 at each node maintains the local and remote sites' resource utilization. Using the resource utilization information, requests for specific resources can be issued to target nodes so as to reassign resources from servicing low cost stages of the task to bottlenecks of the tasks.

As indicated, efficiency gained by disclosed embodiments are derived from obtaining performance data for each stage of the pipelines, and balancing the execution time of stages of tasks in the pipelines. Therefore, an explanation of balancing the stages of the tasks in the pipelines is provided prior to further expanding on the embodiments. In this context, a pipeline is a series of steps (or stages) that need to be performed to complete a task, wherein completion of each step is mandatory before the next step can begin, akin to a factory assembly line. Naturally, the cost for completing each step is different for each task, and indeed, in the context of distributed dedup the cost for each step also changes with time. In the context of distributed dedup, cost can be measured in terms of computing resources or IO latency.

We first consider an example of multi-stage pipeline, wherein three tasks are to be completed, each task having three stages. The cost of each stage (e.g., time to completion) is 1, 2, and 9, for a total of 12 units per task. FIG. 3A illustrates the pipeline process to complete these three tasks, resulting in a total cost of 1+2+(3*9)=30 units. In this example, stage 3 forms a bottleneck and the pipeline includes several stalls.

According to an embodiment, a performance monitor measures the performance of each step of each task for all pipelines to assess the individual costs at each time period. The embodiment then seeks to balance the costs of each stage by sharing resources. For example, if some of the resources dedicated to performing tasks 1 and 2 are shifted or reassigned to support the performance of task 3, it is possible to make each stage have similar cost to the other stages. Although such shifting of resources seems to be to the detriment of stages 1 and 2, which would now increase in cost (e.g., take longer to complete), the total cost for completing all the tasks is reduced since stalls may be eliminated.

An example is illustrated in FIG. 3B, wherein each stage cost was balanced to 4 units. Although the total cost per task remains 12, the total time for completing the three tasks is now 4+4+(4*3)=20. This process is referred to herein as cooperative pipeline, meaning resources are shifted so as to balance the costs of the stages within a task.

Turning back to embodiments for distributed dedup, in FIG. 2 each node in the cluster maintains a global resource info 230, which includes the resource information of the local node, i.e., the node that maintains the specific global resource info 230, and resource information of all other nodes within the cluster, as exemplified by Node X's resource info. Broken-line arrow 232 indicates resource information received at the local node from all other nodes, while broken-line arrow 234 indicates the local node sending its local resource information to all other nodes within the cluster.

A timer 208 may be set by an administrator to direct the performance monitor 200 to periodically collect performance data for each stage of each task of a dedup operation. Each dedup task may be composed of several stages, each of which may be performed by different computing and/or storage resources belonging to each node. Moreover, as previously noted, some stages may be performed by resources on the client, some by resources on the local storage, some by resources on the backup server, and some by resources on the target storage.

FIG. 4 provides one example of segmenting the dedup task into a plurality of stages, wherein every following stage can start executing only after its previous stage completes and provides its output. This is but one example, and it may change depending on the task and available/assigned computing and/or storage resources. Most of these stages may be executed by resources on any node in the cluster, although conventionally there is no resource sharing among the nodes.

FIG. 5 is a block diagram illustrating an example for balancing stages in tasks. The process may start upon receiving any type of trigger, e.g., initiation of backup process. When timer 208 is provided, upon indication of a sampling period by timer 208, at step 500 performance monitor 200 collects throughput data for each task. As exemplified in FIG. 2, the data may include anchoring and SHA1 computing 201 by CPU, optionally encryption 202, index lookup 203 on flash cache, disk IO 204 (container and writing to storage) by target storage, and compression 205 by QAT card. In the example of FIG. 2, performance monitor 200 also collects global dedup ratio 206.

The bottleneck analyzer receives the data and at step 505 calculate stages cost for each pipeline. In the example of FIG. 2, the pipelines shown are dedup pipeline, restore pipeline, garbage collection pipeline, and various apps pipelines (indicated as App xx). For each task, in step 510 the bottleneck analyzer checks if the costs of the stages are balanced and, if so, it proceeds to calculate the next pipeline. If in step 510 the costs are not balanced, the task has a bottleneck, i.e., a stage that causes stalls. When it is determined that the pipeline has a bottleneck causing stalls, in step 520 the bottleneck analyzer 210 may issue a resource request to the resource requester 220. The resource requester 220 then at step 525 determines which resources execute stages that have low cost, so that these resources may be at least partially diverted to support execution of the bottleneck. In one example, if it is determined that a bottleneck causes a stall, it is checked which resources idle during the stall. These resources can be assigned to support in the execution of the bottleneck stage.

The resource requester 220 may then issue resource requests to the nodes at step 530. Notably, if the bottleneck is a stage that may be performed in any node, the requested resource need not reside in the node executing the bottlenecked pipeline, but may be from other nodes.

As noted, optionally the performance monitor 200 also collects global dedup ratio and local compression ratio. These may be used to improve the balancing of the stages' costs and ensure that the reassignment of the resources does not degrade the overall performance of the system. For example, turning back to the example shown in FIGS. 3A and 3B, the total cost of each task must remain the same. That is, the overall throughput and the global dedup ratio must not degrade. According to an embodiment, the global dedup ratio and local compression ratio may be used to weigh the costs of certain stages in the pipelines when balancing the costs. For example, the cost of a certain stage may be defined as the total data input divided by the throughput of that stage. However, for the stages that affect the dedup ratio or compression ratio, the throughput may be weighted to take into account these ratios.

In one example, the cost of a stage performing compression is calculated as input data divided by the product of the stage's throughput and the local compression ratio. For example, in FIG. 4, the stage of packing/writing is the stage that affects the compression ratio that can be defined as the data received by that stage to the data output (i.e., written) by that stage. Consequently, the cost for that stage may be weighted by the compression ratio. Similarly, the cost of the stage affecting the global dedup ratio may be calculated as input data divided by the product of the stage's throughput and the global dedup ratio. Turning back to FIG. 4, while all of the stages are considered parts of the dedup task, the global dedup ratio is, in essence, the ratio of the amount of data input to the index stage and the amount of data output from that stage. That is, in the index stage the fingerprint obtained from the prior stage is compared to the fingerprint index. If the comparison shows that a copy of the file already exists, the only output of the index stage is a pointer to the location of that copy, thus reducing the data output from the index stage and thereby increasing the dedup ratio.

FIG. 6 illustrates an example of a process that may be executed by global resource info 230 at each node in the cluster. At step 600 the global resource info 230 issues a request for resource utilization statistics from a first node, i. At step 605, the global resource info 230 receives the data and updates its table for node i. At step 610 it checks to see whether there are other nodes in the cluster and, if so, at step 615 it updates the request to the next node and revert to step 600. If at step 610 it is determined that statistical utilization data has been received from all of the nodes, at step 620 it checks to see whether a request for statistical utilization data has been received from any other nodes in the cluster. If so, at step 630 it sends the requested data. If not, at step 625 it idles until the next polling period.

Embodiments disclosed herein provide a system for distributed deduplication in a computing cluster having a plurality of nodes, each executing a plurality of tasks having plurality of steps, the system comprising a plurality of global resource modules, each operating within corresponding one of the plurality of nodes and maintaining computing resource utilization of all of the plurality of nodes; a performance monitor module periodically collecting data indicative of throughput of each of the plurality of steps of each of the plurality of tasks; an analyzer receiving the data and determining bottleneck steps for each of the tasks; a requester module reassigning resources of the plurality of nodes so as to balance the throughput of each of the plurality of steps. In some embodiments, resources idling during stalls are reassigned to execute the bottleneck steps, wherein the resources include computing and storage real and virtual resources. In some embodiments, the performance monitor module also periodically collects global dedup ratio and local compression ratio.

Also, embodiments disclosed herein provide a computer-implemented method executing within a computing cluster having a plurality of nodes, each executing a plurality of tasks having plurality of steps, the method comprising maintaining a plurality of global resource modules, and operating each of the global resource modules within corresponding one of the plurality of nodes to store computing resource utilization of all of the plurality of nodes; operating a performance monitor module to periodically collect data indicative of throughput of each of the plurality of steps of each of the plurality of tasks; analyzing the data to determine bottleneck steps for each of the tasks; and reassigning resources of the plurality of nodes so as to balance the throughput of each of the plurality of steps.

Figure 7:
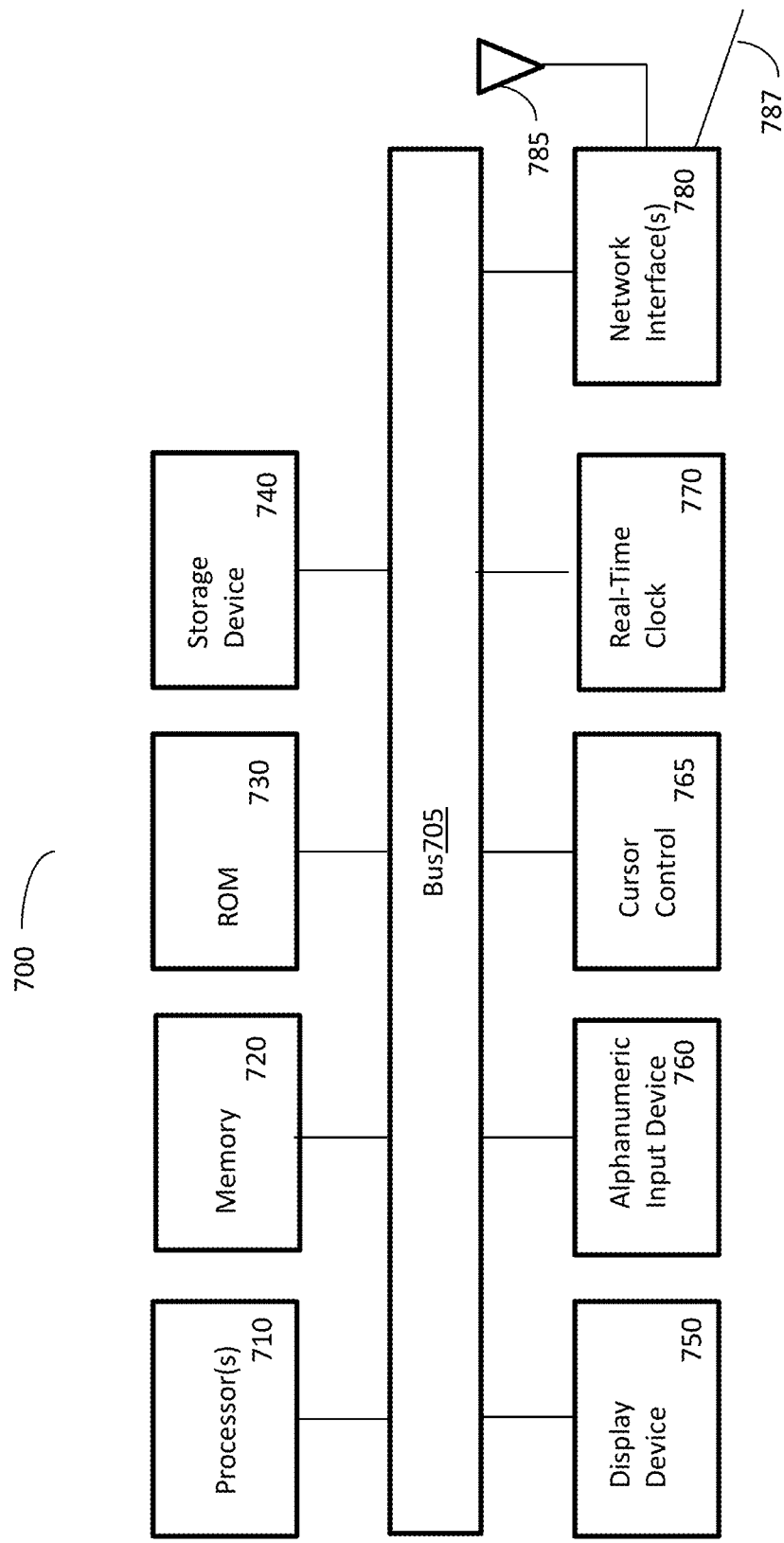
FIG. 7 is a block diagram of one embodiment of a computing system.

FIG. 7 is a block diagram of one embodiment of a computing system 700. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 10 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a cathode ray tube (CRT), light-emitting diode display (LED), or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 1085, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Some or all of the components as shown and described herein may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

What is claimed is:

1. A computer-implemented method for performing distributed deduplication in a cluster of machines forming a plurality of nodes, comprising:

dividing a deduplication process into a plurality of process stages, wherein a group of stages form a task to be executed as a pipeline;

assigning selected nodes from the plurality of nodes to perform assigned process stages and tasks, wherein each of the selected nodes services a plurality of the pipelines;

within each node of the cluster, assigning computing and storage resources to perform each stage of a deduplication task;

while the deduplication process is performed within the cluster, for each pipeline periodically performing:

collecting performance data of each of the computing and storage resources and using the performance data to determine process cost for each of the stages of tasks within a corresponding pipeline;

for each task reassigning, at least partially, computing and storage resources from stages having lower process cost to stages having higher process cost;

updating resources utilization of each node within the cluster.

2. The method of claim 1, wherein reassigning, at least partially, computing and storage resources includes reassigning computing and storage resources of one node to perform stages of tasks on another node.

3. The method of claim 1, wherein reassigning, at least partially, computing and storage resources is calculated to balance the process cost of the stages of each task.

4. The method of claim 3, further comprising calculating a global deduplication ratio and wherein determining process cost for each of the stages comprises weighting the process cost of at least one stage by the global deduplication ratio.

5. The method of claim 4, further comprising calculating a local compression ratio and wherein determining process cost for each of the stages comprises weighting the process cost of at least one stage by the local compression ratio.

6. The method of claim 1, wherein the plurality of pipelines includes at least a deduplication pipeline, a restore pipeline, and a garbage collection pipeline.

7. The method of claim 1, further comprising at each node maintaining information of computing and storage resources of other nodes within the cluster and sending local information of computing and storage resources to other nodes within the cluster.

8. A non-transitory computer-readable medium programmed with executable instructions that, when executed by a processing system having at least one hardware processor, perform operations for performing distributed deduplication in a cluster of machines forming a plurality of nodes, the operations comprising:

dividing a deduplication process into a plurality of process stages, wherein a group of stages form a task to be executed as a pipeline;

assigning selected nodes from the plurality of nodes to perform assigned process stages and tasks, wherein each of the selected nodes services a plurality of the pipelines;

within each node of the cluster, assigning computing and storage resources to perform each stage of a deduplication task;

while the deduplication process is performed within the cluster, for each pipeline periodically performing:

collecting performance data of each of the computing and storage resources and using the performance data to determine process cost for each of the stages of tasks within a corresponding pipeline;

for each task reassigning, at least partially, computing and storage resources from stages having lower process cost to stages having higher process cost;

updating resources utilization of each node within the cluster.

9. The medium of claim 8, wherein reassigning, at least partially, computing and storage resources includes reassigning computing and storage resources of one node to perform stages of tasks on another node.

10. The medium of claim 8, wherein reassigning, at least partially, computing and storage resources is calculated to balance the process cost of the stages of each task.

11. The medium of claim 10, wherein the operations further comprise calculating a global deduplication ratio and wherein determining process cost for each of the stages comprises weighting the process cost of at least one stage by the global deduplication ratio.

12. The medium of claim 11, wherein the operations further comprise calculating a local compression ratio and wherein determining process cost for each of the stages comprises weighting the process cost of at least one stage by the local compression ratio.

13. The medium of claim 8, wherein the plurality of pipelines includes at least a deduplication pipeline, a restore pipeline, and a garbage collection pipeline.

14. The medium of claim 8, wherein the operations further comprise at each node maintaining information of computing and storage resources of other nodes within the cluster and sending local information of computing and storage resources to other nodes within the cluster.

15. A system comprising:

a processing system having at least one hardware processor, the processing system coupled to a memory programmed with executable instructions that, when executed by the processing system, perform operations for performing distributed deduplication in a cluster of machines forming a plurality of nodes, the operations comprising:

dividing a deduplication process into a plurality of process stages, wherein a group of stages form a task to be executed as a pipeline;

assigning selected nodes from the plurality of nodes to perform assigned process stages and tasks, wherein each of the selected nodes services a plurality of the pipelines;

within each node of the cluster, assigning computing and storage resources to perform each stage of a deduplication task;

while the deduplication process is performed within the cluster, for each pipeline periodically performing:

collecting performance data of each of the computing and storage resources and using the performance data to determine process cost for each of the stages of tasks within a corresponding pipeline;

for each task reassigning, at least partially, computing and storage resources from stages having lower process cost to stages having higher process cost;

updating resources utilization of each node within the cluster.

16. The system of claim 15, wherein reassigning, at least partially, computing and storage resources includes reassigning computing and storage resources of one node to perform stages of tasks on another node.

17. The system of claim 15, wherein reassigning, at least partially, computing and storage resources is calculated to balance the process cost of the stages of each task.

18. The system of claim 17, wherein the operations further comprise calculating a global deduplication ratio and wherein determining process cost for each of the stages comprises weighting the process cost of at least one stage by the global deduplication ratio.

19. The medium of claim 18, wherein the operations further comprise calculating a local compression ratio and wherein determining process cost for each of the stages comprises weighting the process cost of at least one stage by the local compression ratio.

20. The medium of claim 15, wherein the plurality of pipelines includes at least a deduplication pipeline, a restore pipeline, and a garbage collection pipeline.

21. The medium of claim 15, wherein the operations further comprise at each node maintaining information of computing and storage resources of other nodes within the cluster and sending local information of computing and storage resources to other nodes within the cluster.

* * * * *